United States Patent [19]
Stolzer

[11] Patent Number: 5,088,364
[45] Date of Patent: Feb. 18, 1992

[54] WORKPIECE HANDLING SYSTEM, PARTICULARLY CUT-OFF PIECES FROM ROD OR RAIL-SHAPED STOCK MATERIAL, AND METHOD

[75] Inventor: Armin Stolzer, Renchen, Fed. Rep. of Germany

[73] Assignee: Keuro Maschinenbau GmbH & Co. KG, Achern-Gamshurst, Fed. Rep. of Germany

[21] Appl. No.: 558,148

[22] Filed: Jul. 25, 1990

[30] Foreign Application Priority Data

Aug. 21, 1989 [DE] Fed. Rep. of Germany ....... 3927530

[51] Int. Cl.$^5$ .............................................. B23D 47/04
[52] U.S. Cl. .......................................... 83/43; 83/153; 83/206; 83/277; 83/282
[58] Field of Search ....................... 83/153, 477.2, 150, 83/206, 277, 486.1, 42, 43, 282

[56] References Cited

U.S. PATENT DOCUMENTS

| | | | |
|---|---|---|---|
| 3,605,538 | 9/1971 | Bohmer et al. | 83/206 |
| 4,018,118 | 4/1977 | Goff | 83/167 |
| 4,765,215 | 8/1988 | Spath | 83/153 |
| 4,823,662 | 4/1989 | Stolzer | 83/150 |

FOREIGN PATENT DOCUMENTS 3448041 5/1986 Fed. Rep. of Germany .
2087285 5/1982 United Kingdom ................ 83/206

*Primary Examiner*—Douglas D. Watts
*Assistant Examiner*—John M. Husar
*Attorney, Agent, or Firm*—Frishauf, Holtz, Goodman & Woodward

[57] ABSTRACT

To provide for efficient handling of stock material (40) and cut-off elements (41), which may be workpieces or cut-off wedges, by a cut-off saw, with miter adjustments, a positioning finger (21) is pressed against the stock material to engage the stock material against a guide plate or bar (19) prior to clamping the stock material in position for cut-off. After cutting of the stock material, the clamp (5) is released, and the finger is moved to a position ahead of the cut-off surface, and then longitudinally in feeding direction to a removal conveyor (28) so that the cut-off element is raked away by the positioning finger. After removal, the positioning finger is retracted out of the path of the stock material and, while new stock material is being fed, is longitudinally returned to the starting position to again align new stock material against the guide plate or bar (19).

21 Claims, 10 Drawing Sheets

WORKPIECE HANDLING SYSTEM, PARTICULARLY CUT-OFF PIECES FROM ROD OR RAIL-SHAPED STOCK MATERIAL, AND METHOD

Reference to related patent application and patent, assigned to the assignee of the present application, the disclosures of which are hereby incorporated by reference: U.S. Pat. No. 4,823,662, by the inventor hereof: Armin Stolzer; U.S. Ser. No. 07/550,851, filed July 10, 1990, Stolzer et al. Reference to related disclosure: German Patent 34 48 041, Lindner et al.

FIELD OF THE INVENTION

The present invention relates to a system to handle cut-off pieces severed from elongated rod or rail material, for example by a circular saw. The cut-off pieces may be actual desired workpieces or scrap items which, for example, arise when stock material is first cut at 90° angle with respect to its longitudinal extent and then a miter cut is to be made, leaving a wedge-shaped cut-off element which may be returned to scrap. Within the context of this application, the term "workpiece" may be applied to all of the cut-off elements, whether they are the desired cut-off pieces or scrap which arises in the cutting-off operation.

BACKGROUND

U.S. Pat. No. 4,823,662, by the inventor hereof, and assigned to the assignee of the present application, describes, in general, an apparatus in which a clamping carriage is provided, which controls feed of stock material to be severed, while also controlling removal of previously severed workpiece material. Additional hold-down clamps secure the stock material against a work table. The severing element is a circular saw. The clamping carriage, in addition to clamping and holding the stock material and feeding it to the saw should be as compact as possible and readily controllable. It is not sufficient that the clamping carriage can only push the rail or stock material in steps to the saw so that the required length of the rail or rod element can be cut; additionally, arrangements must be made to remove the cut workpieces and, if necessary, differentially removing them or sorting them with respect to length, whether they are desired workpieces or scrap, and the like. This removal and sorting should not interfere with the working cycle of the saw. Typically, the saw is a cold saw. It is also necessary that short scrap pieces have to be removed, which arise, for example, when a miter or bevel angle has to be changed between succeeding saw cuts. The clamping carriage also must feed the material down to its very end, so that it can be used as completely as possible with the least amount of remainder or scrap ends.

The apparatus of my earlier U.S. Pat. No. 4,823,662, to which German Patent 37 02 223 corresponds, can solve these problems. It has been found, however, that the apparatus is larger and more complex than desired, although special infeed clamping jaws are not required thereby.

THE INVENTION

It is an object to improve a circular saw system, and particularly a cold saw system, which operates as efficiently and rapidly as the system of my earlier U.S. Pat. No. 4,823,662, but which is easier to control, easier to make, and lighter. The short cycling times and particularly the non-cutting intervals obtained in accordance with the prior system for feeding the stock material for a subsequent cut, which overlaps removal of the cut workpiece or scrap material should be retained.

Briefly, a work table is formed with a slit for a cutting saw, the slit defining a cutting plane. A feed system feeds stock material in a feeding direction towards the cutting plane, the stock material being guided by a guide plate or guide bar defining a guide plane downstream of the saw, to guide the stock material after severing of the workpieces, or scrap cut-offs from the stock. A positioning and clamping arrangement is movable towards the guide plate or bar engages the stock material prior to severing the stock material and positions the stock material against the guide plate or bar. A hold-down arrangement holds the stock material against the work table, so that the saw can effectively cut the stock.

In accordance with a feature of the invention, the positioning devices include a projecting finger which acts laterally against the stock material and in a direction transverse to the feeding direction to press the stock material against the guide plate or guide bar. The finger has a clamping or gripping surface which extends at right angles to the feed direction, and is movable at least approximately up to the guide plane of the guide plate or bar. An operating system is coupled to position the finger out of engagement with the stock material, or into engagement with the stock material to press it against the guide plate or bar, and, after severing, to reach behind the severed workpiece or scrap end for pulling the workpiece or scrap end away from the cutting plane for subsequent removal, upon longitudinal movement of the operating apparatus to which the finger is coupled. A hold-down device is formed with a recess to permit entry of the finger at least in part therebeneath.

The system has the advantage that the stock material which is fed to the saw and past the cutting plane—with the saw blade withdrawn—is securely engaged against the guide plate or bar, and will be placed in precisely parallel relationship with respect to the feed direction before it will be clamped by the hold-down clamping device. The finger is then retracted to permit the saw to cut.

As the saw cuts, the feed clamping jaws are released, moved backwardly counter the feed direction by the length of the next-to-be-cut stock material, and then reclamp the stock material.

As soon as the cut is finished, the finger can be fed into the kerf left by the saw blade, and rake the cut workpiece or scrap material for removal of the workpiece or scrap material. If the finger cannot enter the kerf, the feeding clamps retract the stock material slightly backwardly, counter the feed direction and away from the cutting plane to permit the finger to engage behind the cut workpiece. Of course, the hold-down clamp or simimilar device had previously been released.

The finger then, being coupled to a longitudinal slide, engages behind the cut workpiece and rakes it longitudinally along a removal table, which may include a roller conveyor. At the same time, the feed clamping jaws feed the stock material past the cutting plane to permit the next cut to be made. As soon as the finger has reached the removal position, it is again retracted from behind the cut workpiece or scrap, and returned to a position just adjacent the cutting plane, to press the now newly fed stock material against the guide bar or plate. As soon as the stock material is again properly aligned against the guide bar or plate, the hold-down device or clamp holds it in place, the finger can retract, and the saw blade can make another cut.

Synchronized movement of the respective clamping jaws, hold-down element, the finger back-and-forth as well as longitudinally, can readily be controlled by any suitable sequencing or control unit.

The arrangement has the additional advantage that the system can be simple while carrying out all the required functions.

In accordance with a preferred feature of the invention, the recess in the vertical clamping jaw or device is located at the stock supply side adjacent the cutting plane, to permit the finger to align the stock material against the guide plate or bar. This arrangement permits the clamping surface of the vertical clamping jaw to hold the portion of the stock material which will be severed and can hold even very small workpieces or other cut elements, such as mitered scrap wedges.

In accordance with another preferred feature of the invention, the finger is a thin-walled narrow element fitting into the recess of the vertical clamping jaw or device. Making the finger as thin as possible, while considering the strength of the material to provide for alignment, permits retention of as much material as possible on the vertical clamping jaw device, that is, to make the recess into which the finger fits also equally small.

Preferably, the clamping edge of the finger is slightly higher than half of the maximum stock diameter which the saw is designed to handle. This permits reducing the size of the finger to a minimum dimension, and hence making the recess in the vertical clamping jaw as small as possible, while still providing for reliable guidance against the guide plate or bar.

After the finger has removed the workpiece or scrap, and placed the respective elements on a removal table or conveyor, the workpiece or scrap can then be sorted and/or further handled; sorting or handling can be carried out automatically, for example by sensing the respective elements electro-optically or the like; they can then be thrown off by tilting of the removal table or the like into suitable receptacles. A material handling apparatus suitable for association with the saw system of the present invention is described in my copending application Ser. No. 07/550,851, filed July 10, 1990.

DRAWINGS

DETAILED DESCRIPTION

Figure 1:
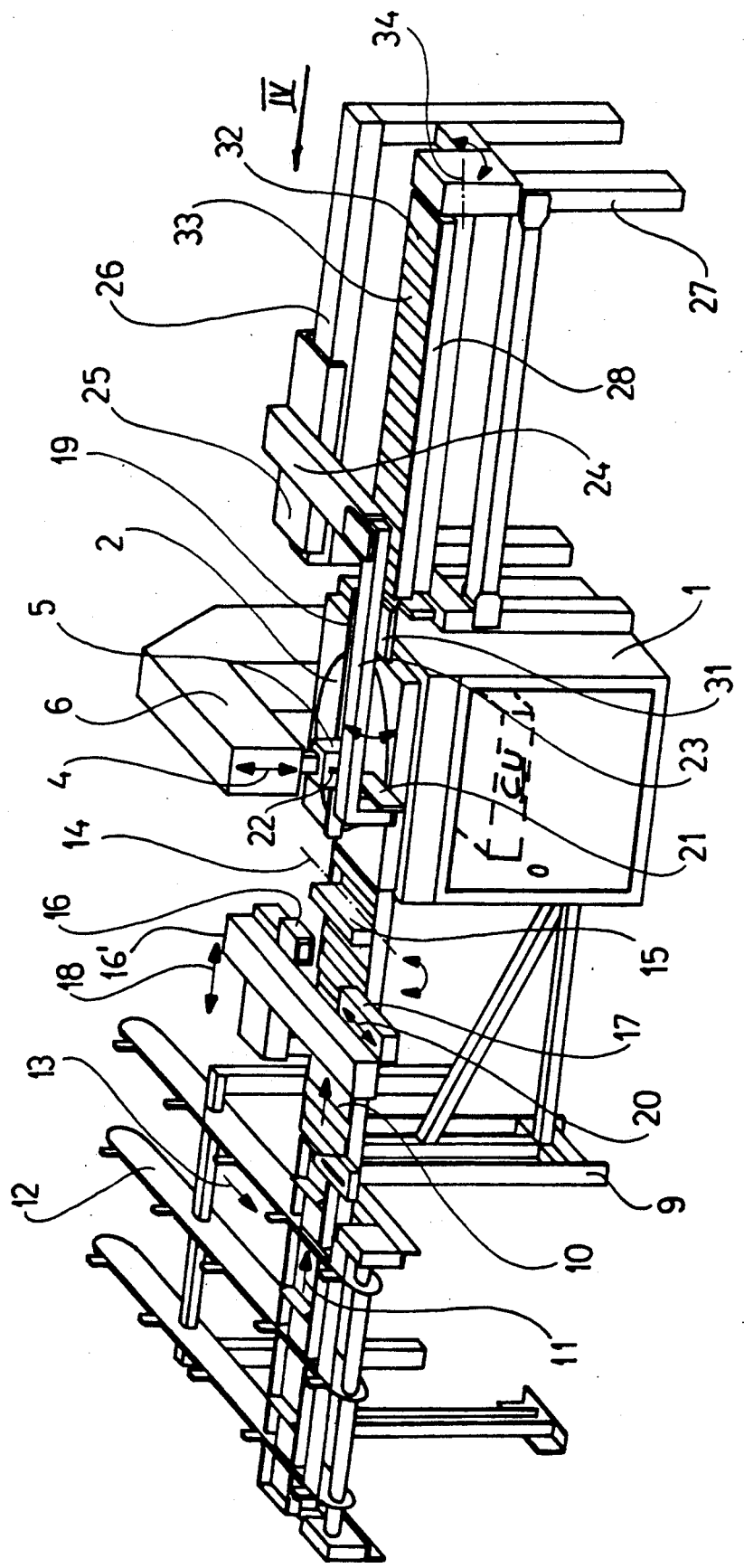
FIG. 1 is a general isometric view of the saw system in accordance with the present invention.

The saw system of FIGS. 1-4 includes a frame 1, which may further have a cabinet portion in which a control unit CU can be placed. The control unit CU is shown only schematically, since it can be of any well known construction; operating control elements, such as a control console and the like have been omitted from the drawing since it can be of standard design, and does not form part of the present invention.

Figure 2:
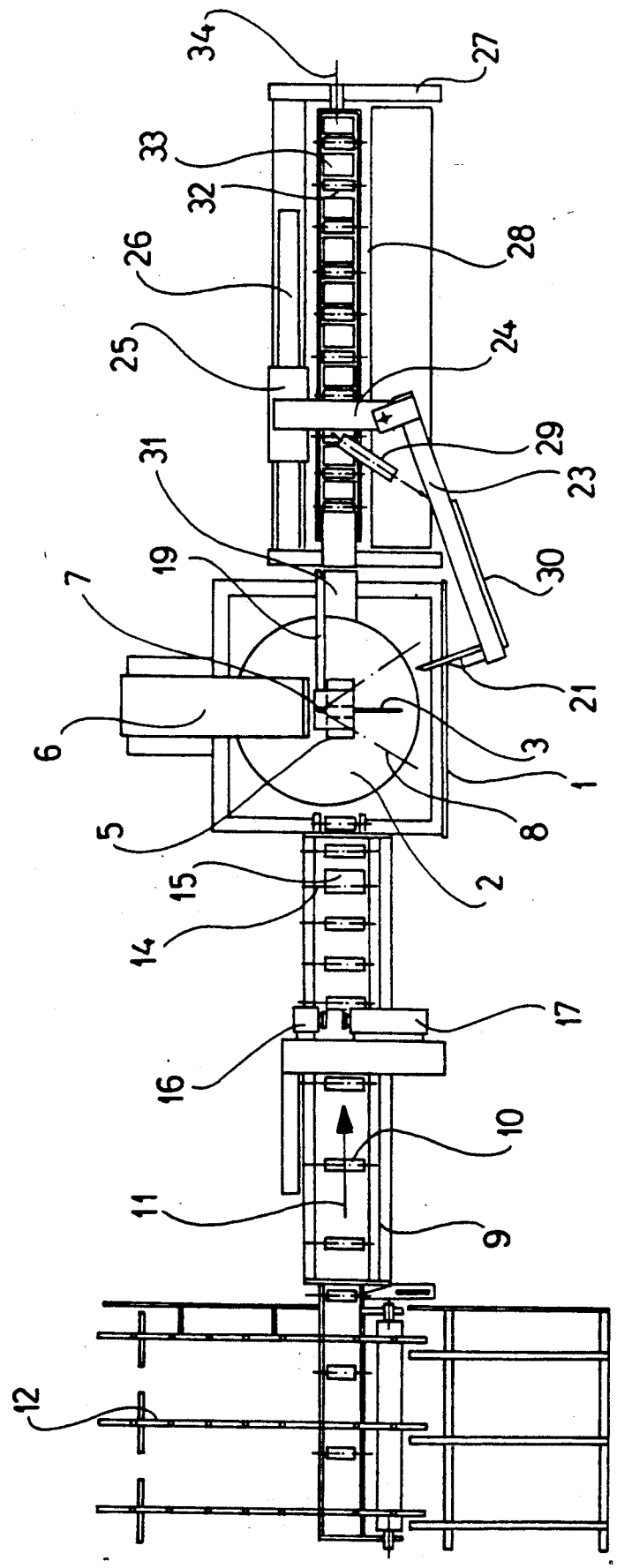
FIG. 2 is a top view of the system of FIG. 1.
Figure 3:
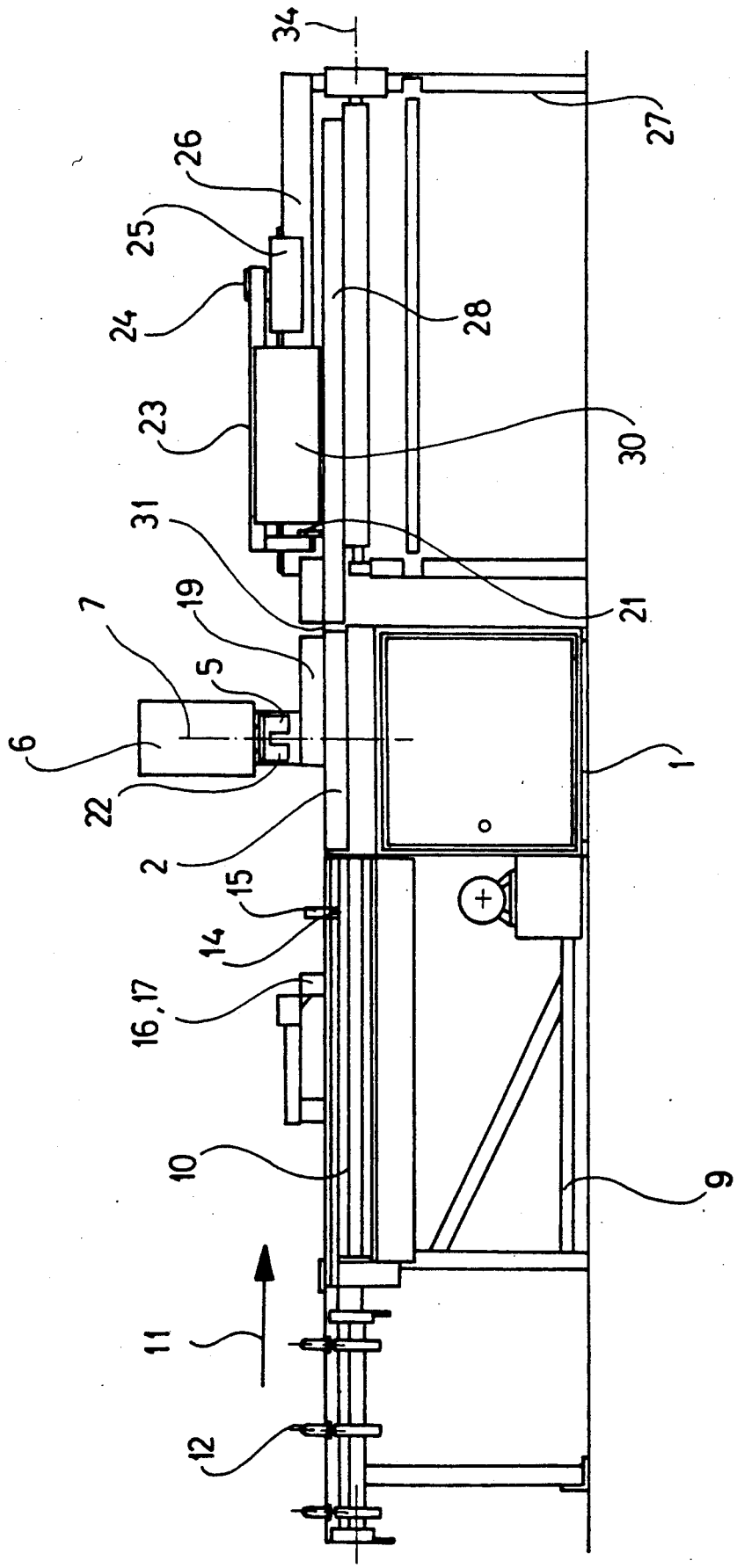
FIG. 3 is a front view of the system of FIG. 1.

The frame 1 carries a work table 2 in form of a turret. The turret has a slit which defines a cutting plane, in which a circular saw blade—not further shown—can be fed from down below to sever rod or rail or other elongated stock material, not shown in FIG. 1. The saw blade is fed vertically, to sever the material, which is held in position against the feed direction of the saw blade by a vertical clamping jaw 5. Vertical clamping jaw 5 is secured to a holder 6 which, in turn, is rigidly connected to the frame 1. The vertical clamping jaw 5 can be adjusted up and down as shown by the double arrow 4. When the clamping jaw 5 is in its downward position, it clamps the stock material against the table 2. The saw blade, together with the table 2 (see FIG. 3) can be pivoted about a vertical axis 7 within a range of angle 8 (FIG. 2). It can be fixed in position, at 90° to the feed direction, indicated by arrows 11, or pivoted about a miter or bevel angle, in order to be able to make either 90° or miter cuts across the stock material.

A supply system is coupled to the saw, which includes a supply frame 9 with feed rollers 10 which are driven and can rotate in either direction. The feed direction of the stock material is shown by arrow 11, towards the cutting plane 3. After the material has been cut, for example after a predetermined number of desired workpieces have been cut, the rollers can be driven in reverse direction to remove remaining stock material for return to a stocking shelf or the like. A chain feed 12 is coupled to the feed roller conveyor 10. Rod or rail material can be inserted or placed on the chain group 12, to be moved in accordance with the arrow 13 for transport to the conveyor 10.

To determine the length of the material to be cut off, the saw system has a reference abutment 15 against which stock material, to be handled, is engaged by moving the rollers of the roller conveyor 10, to place the stock material into a base or reference position.

A pair of feed clamping jaws 16, 17 are movable in feed direction in accordance with the double arrow 18, both forwards and backwards, with respect to the sawing plane 3. The jaw 16 of the clamping jaws 16 and 17 is fixed; the jaw 17 is movable in accordance with the arrow 20. The fixed jaw 16 is positioned to be in-line with an alignment bar, strip or plate 19, and associated with the saw—see also FIGS. 2 and 3. The alignment element 19 forms an engagement plane for the stock material. The engagement plane passes through the pivoting axis 7 of the turret 2. Moving the movable jaw 17 in accordance with the double arrow 20 permits clamping or release of stock material from the feed system formed by the jaws 16, 17.

When a new rod or rail stock is fed, it is placed into engagement with the reference abutment 15. The feed jaws 16, 17, after having been moved counter the feed direction, are clamped against the stock material into a predetermined position in dependence on the next severing length for the next workpiece. The abutment 15 is then tipped downwardly about its tipping axis 14 to release the clear space for the stock material, which is then fed by jaws 16, 17 into the cutting plane 3 on the worktable 2. It will be in immediate engagement against the guide sheet or guide plate or bar 19.

To provide for precise alignment for the subsequent sawing step, it is necessary that the stock material be reliably engaged against the alignment bar or plate 19.

In accordance with a feature of the invention, a finger 21, which can be adjusted transversely to the feed direction 11 against the stock material, or towards the bar or plate 19, respectively, is pressed against the stock material which will form the workpiece, against the bar or strip 19. This aligns the stock material against the bar or plate 19. After this alignment has been effected, the vertical clamping device or jaw 5 is lowered, to clamp the stock material which will form the workpiece against the work table 2. To prevent interference between the finger 21 and the vertical clamping jaw 5, regardless of the cross-sectional shape or size of the stock material, the vertical clamping jaw 5 is formed with a recess 22. The recess 22 extends slightly towards the left of plane 3. In FIG. 2, that is counter the feed direction 11, and includes the cutting plane 3. The finger 21, hence, can engage through said recess 22 essentially adjacent the cutting plane 3. This arrangement, in accordance with a feature of the invention, is particularly preferred since—and with reference to FIG. 2 at the right portion next to the cutting plane 3—it permits a clamping surface of the vertical clamping jaw 5 which is as large and effective as possible; in other words, the clamping surface is not essentially reduced, so that even small pieces which extend beyond the cutting plane 3 can be reliably clamped by the vertical clamping jaw 5.

In accordance with another feature of the invention, the finger 21 should be as thin as possible so that the recess 22—taken in the direction of feed 11—can be as small as possible. Thus, and with reference to FIG. 2 at the left of the cutting plane 3, reduction of the clamping surface of the vertical clamping jaw 5 will also be small.

The finger 21 is secured to an operating arm 23 which is pivoted at one end on a bridge element 24, coupled to a slider 25. The other end of the operating arm 23 secures the finger 21. The slider 25 can shift longitudinally along a guide track 26, parallel to the feed direction 11. The guide track 26 is carried by a support 27 of a removal conveyor 28, and located above the working plane of the removal conveyor 28. The bridge element 24 is raised above the removal conveyor 28 by a distance sufficient to provide clearance and safety space above the maximum cross section of the workpiece for which the unit is designed when a workpiece is on the removal conveyor 28. A cylinder-piston unit 29 (FIG. 2) is movably secured to the bridge and to the operating arm 23, respectively, so that the operating arm 23 can be moved between the position shown in FIG. 1 and FIG. 2. In the position shown in FIG. 2, finger 21 is out of engagement with the workpiece.

The length of the guideway 26, and hence the range for longitudinal movement of the finger 26 parallel to the feed direction 11, is so designed that—as will be described in detail below—the finger 21 can move between a position at the left of the vertical clamping jaw 5 to a postion where it will be above the removal conveyor 28, so that it can grasp or rake a workpiece which has been severed and after withdrawal of the saw blade, and pull it on the removal conveyor 28. The workpiece, thus, can be raked off to the removal conveyor. To prevent lateral shifting or random movement of the workpiece away from the removal conveyor, a guide sheet 30, for example a sheet element (FIGS. 2, 3), is secured to the operating arm 23. Guide sheet 30 extends, effectively, to the support surface for the workpiece to guide the workpiece to the removal conveyor 28.

The removal conveyor 28, in accordance with a feature of the invention, is so constructed that it presents as few interruptions to a smooth surface as possible. This prevents even small workpieces or scrap material from falling or catching in the removal conveyor. Such small pieces, particularly slivers, wedges and the like, may occur when the miter angle of the saw is changed. Guide sheets 33 are located between transport rollers 32 of the conveyor 28, the guide sheets extending almost to the crest of the rollers so that the rollers extend only slightly therebeyond to leave as few and as small spaces between the rollers 32 and the guide sheets as possible and prevent catching of scrap material in the gaps between the rollers and the guide sheets.

Figure 4:
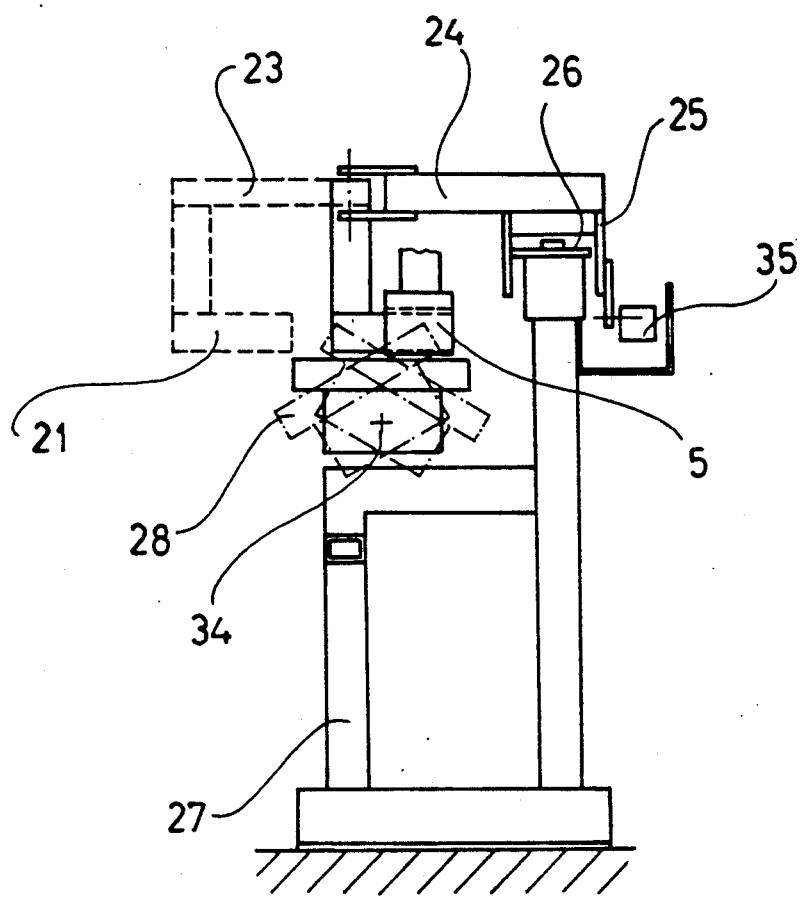
FIG. 4 is a fragmentary view of the saw of FIG. 1, looking in the direction of the arrow IV and omitting elements not material to the explanation of the drawing.

The conveyor 28, as seen in FIG. 4, can be located to tilt about a pivot axis 34, to form a tipping table, so that workpieces can be selectively ejected towards the right or to the left—with respect to the feed direction 11—for example, selectively, in a reception container for workpieces at one side and into another reception container for scrap at the other.

FIG. 4, highly schematically, also shows a drive 35 to feed the slide 25 along the slide way or guide 26.

Various operations, as well known, are controlled from a central control unit CU (FIG. 1) for synchronized operation of operating steps. These operating steps can be carried out entirely automatically; they may control the cylinder—piston arrangement 29 for the operating arm 23 of the finger 21, the motor 35 for the longitudinal displacement of the operating arm 23, the clamping movement of the vertical clamping jaw 5, the clamping movement and feed movement of the feed jaws 16, 17, the conveyors and the like.

Operation, with Reference to FIGS. 5 to 13

FIGS. 5-13 are schematic illustrations, drawn to the same schematic diagram. A suitable rotary or circular saw blade, not shown, is placed beneath the turret 2 and adjusted to cut precisely vertically with respect to the feed direction 11.

Figure 5:
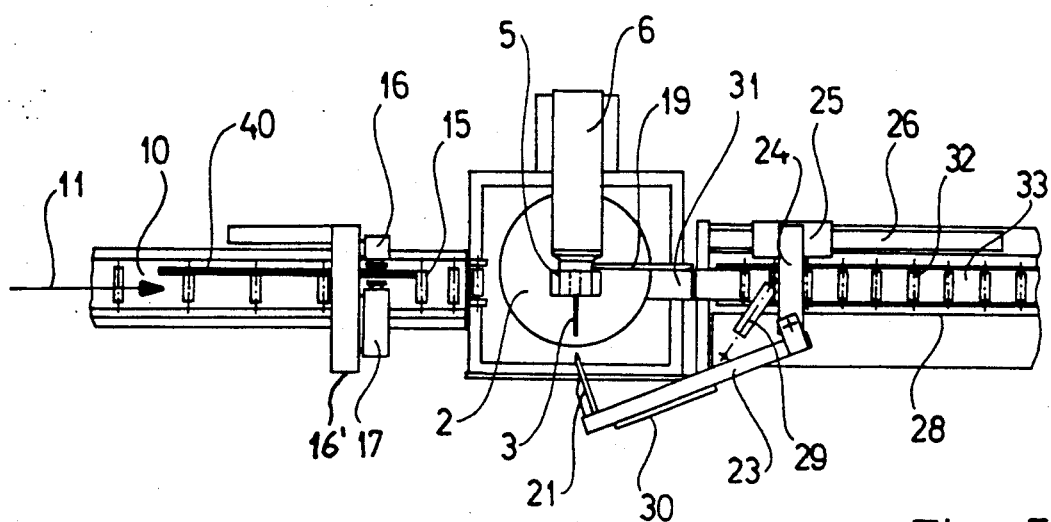
FIGS. 5 through 13 illustrate sequential steps in the operation of the saw system of FIGS. 1-4 in which the saw is to carry out a 90° cut.

FIG. 5: A rod 40, forming feed stock, is placed on the feed conveyor 10, which is started to feed the stock 40 against the reference abutment 15. The stock 40 thus is placed in base position. The feed jaws 16, 17 are then placed longitudinally with their support 16' to such a position that, upon subsequent longitudinal movement of the feed jaws 16, 17, the position of the stock material 40 will correspond precisely to the length of material which is to be cut by the saw at the cutting plane 3. Arrangement or placement of the feed jaws 16, 17 can be carried out simultaneously with feeding of the stock 40 against the abutment 15. The vertical clamping jaw 5 is upwardly retracted, and the finger 21 is operated out of the feed path of the stock material 40.

Figure 6:
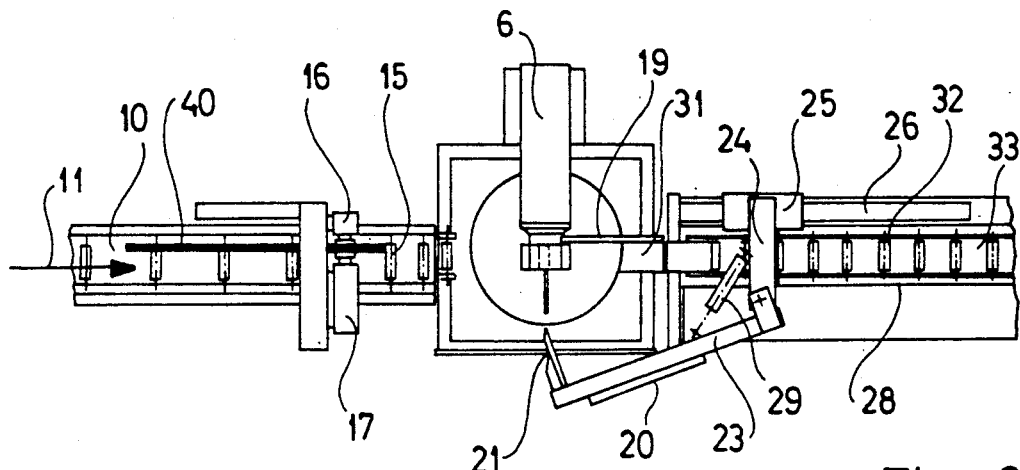
Figure 7:
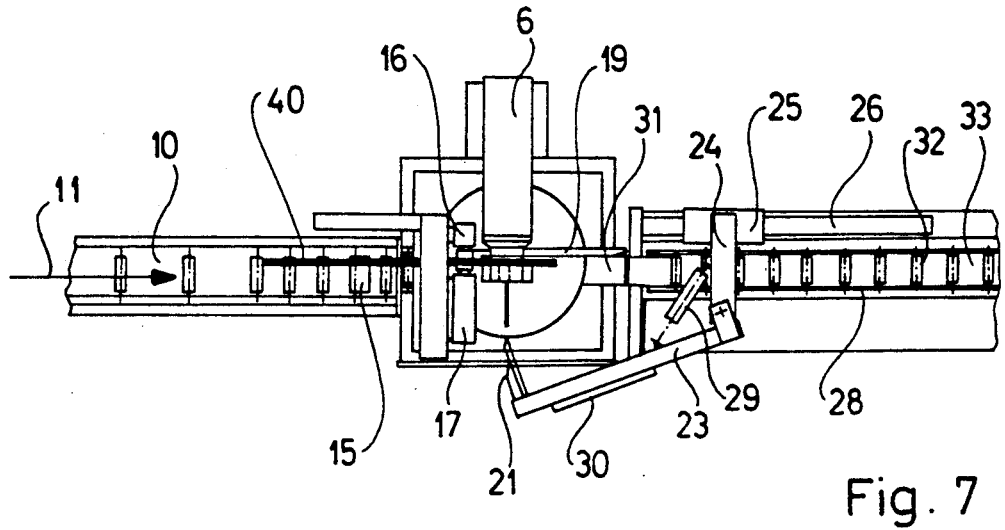

FIG. 6 illustrates clamping of the clamping jaws 16, 17 to grip the stock 40. In FIG. 7, the reference abutment 15 has been pivoted downwardly out of the feed path for the stock material 40 about its pivoting axis 14. The feed jaws 16, 17 can feed the rod material 40 into the cutting range of the saw. The stock material 40 is being placed adjacent the guide bar or plate 19 for aligning the stock material 40 parallel to the feed direction 11.

Figure 8:
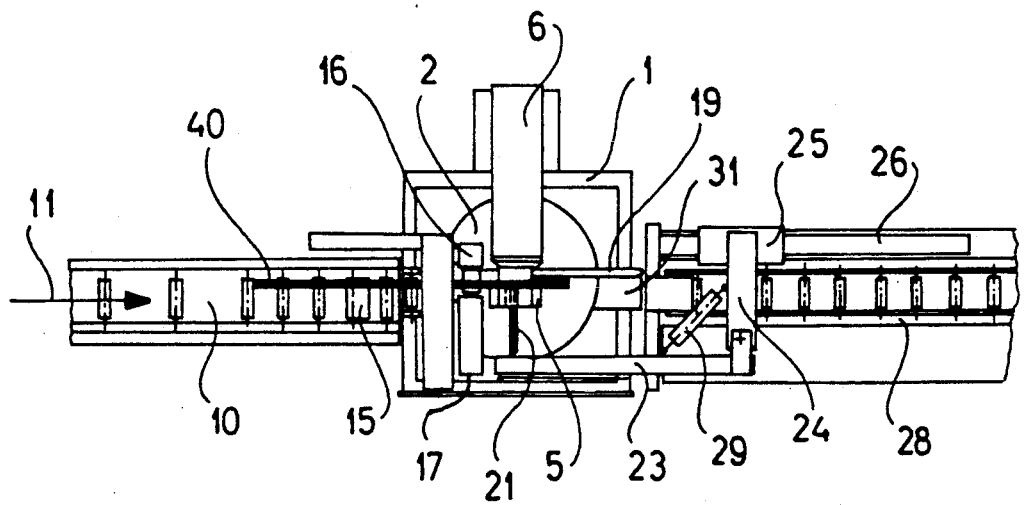

Precise alignment of the stock material 40 against the plate 19 is obtained—see FIG. 8—by pressing the finger 21 against the stock material 40. The cylinder—piston arrangement 29 is contracted to move the operating arm 23 into the position shown in FIG. 8. The vertical clamping jaw 5 is still raised.

Figure 9:
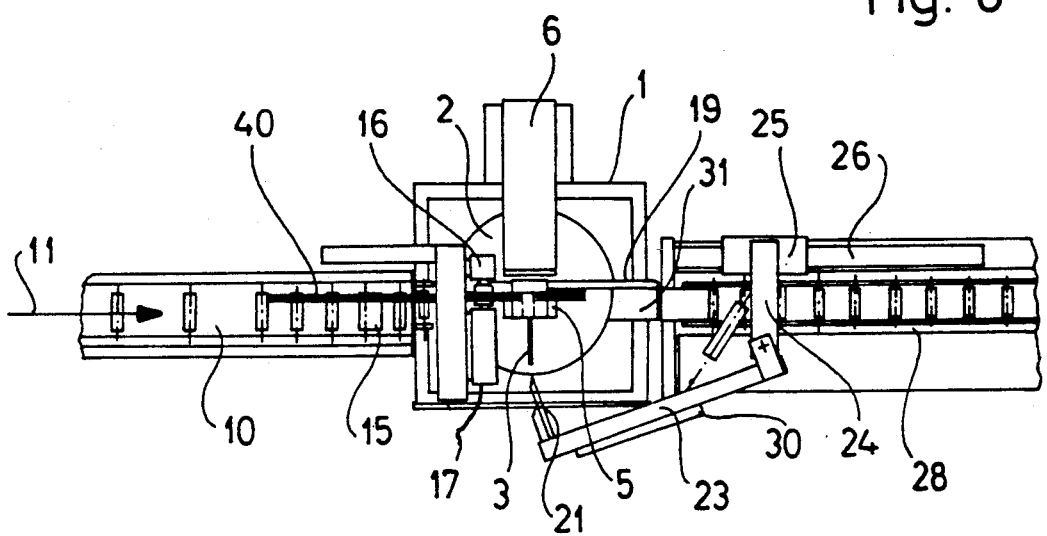

FIG. 9 illustrates clamping movement of the vertical jaw 5 to press the stock material 40 against the work table 2. The finger 21 does not interfere with this clamping movement since the vertical jaw 5 can accept the finger 21 in its recess 22. Thus, the stock material 40 is precisely aligned against the guide bar or plate 19 and, after such precise alignment, clamped in position.

FIG. 9 also illustrates removal of the finger 21 from the cutting range, by operation of the cylinder—piston unit after vertical jaw 5 has clamped the stock material 29.

The saw can now be operated to cut the stock material and cut off the workpiece. Since the stock material is clamped by the vertical clamping jaw 5, the feed jaws 16, 17 can release and reset towards the left for a distance corresponding to the length of the next workpiece which is to be made, and for re-clamping of the stock material.

Figure 10:
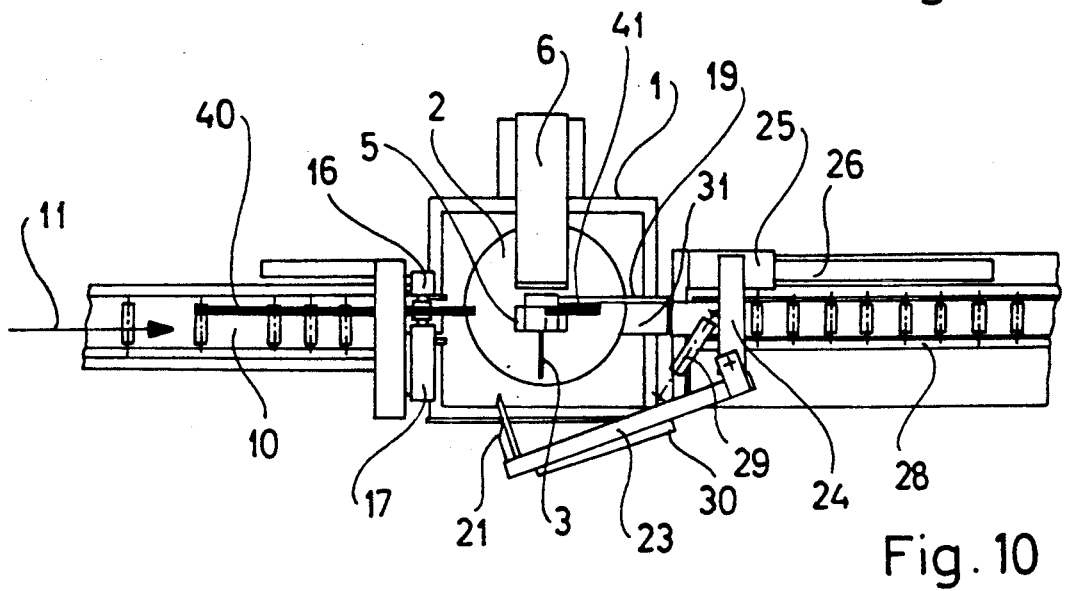

FIG. 10 illustrates that the clamping jaws 16, 17 now move counter the direction of feed. Likewise, the slide 25 carrying the bridge 24 and operating arm 23 to which finger 21 is attached moves counter the feed direction, that is, to the left. The return or left or counter stroke of the feed jaws 16, 17 is slightly longer than the counter stroke of the slide 25 which controls the position of the finger 21. The saw is withdrawn.

Figure 11:
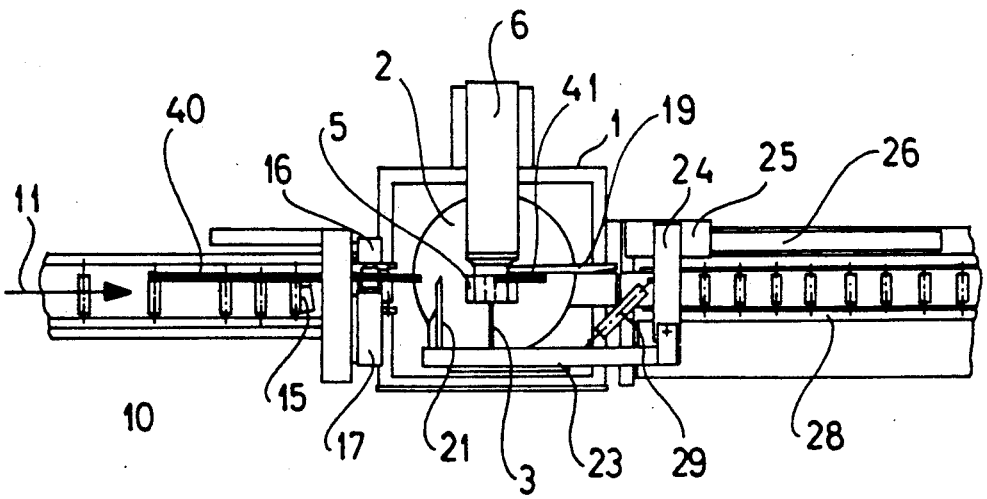

This differential length is used to permit the position of FIG. 11 in which, after operation of the cylinder—piston unit 25, the operating arm 23 is pivoted towards the workpiece and the finger engages behind the workpiece and in advance of the next element of the stock material which is to be severed. The stock material 40, having withdrawn slightly further than the leftward or counter stroke of the finger 21 permits ready entry of the finger 21 in the position shown in FIG. 11.

Figure 12:
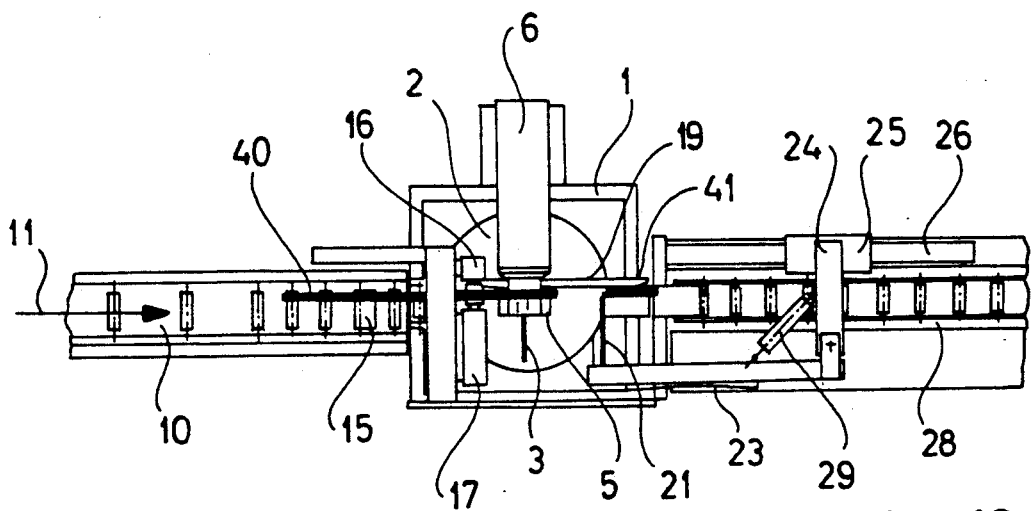
Figure 13:
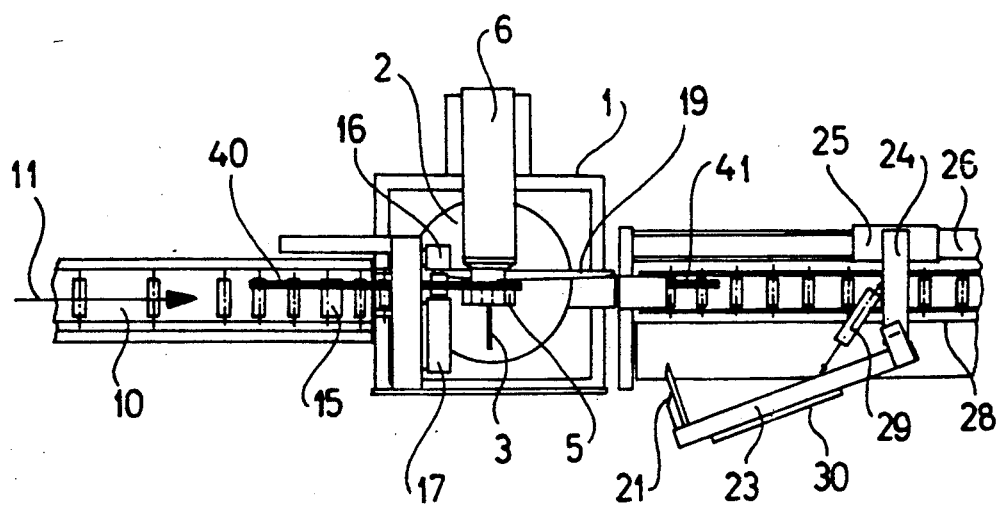

FIG. 12 shows the next operating step in which the feed jaws 16, 17 as well as the slide 24 and hence the finger 21 are moved again in feed direction 11. The stock material 40 is fed forwardly so that the stock material passes the cutting plane 3. The previously made workpiece 41 is raked by the finger 21 towards the removal conveyor 28. As best seen in FIG. 13, this movement is controlled by moving the slide 25 on its guide way or slide way 26, to place the workpiece or any severed material 41 completely on the removal conveyor, so that the element 41 can be fed in the feed direction 11 thereby; Alternatively, lateral tipping (FIG. 4) of the removal conveyor at this position or at a later rightward position (FIG. 13) can eject the element 41 to the right or to the left into a suitable receptacle. The finger 21 is again retracted outwardly, see FIG. 13.

The next step is return of the finger 13 to the position shown in FIG. 7, and the cycle will repeat.

Sequencing of the cycle, of course, is under control of the control unit CU, which can be any well known sequencing apparatus, for example manually and/or computer or numerically controlled.

The guide sheet 30 (FIG. 2) has been omitted from FIGS. 5–13, and also from FIGS. 14–20. This guide sheet prevents misalignment of the element 41 as the element 41 is raked by the finger 21 on the removal conveyor 28. This is particularly important for workpieces or scrap material of substantial cross section.

Operation for Miter Cuts, with Reference to FIGS. 14–20

Figure 14:
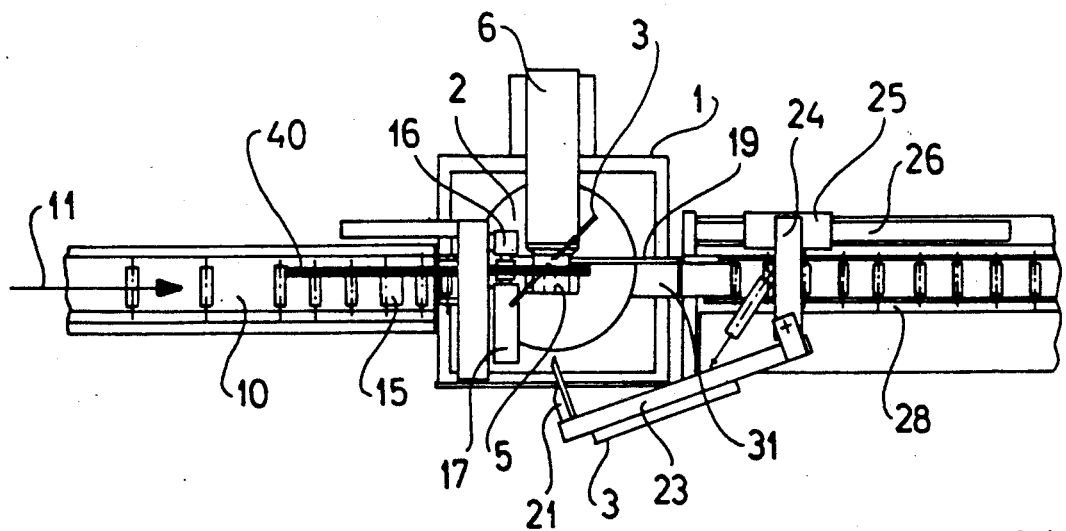
FIGS. 14 to 20 are sequential figures illustrating the operating steps in which the saw of FIGS. 1-4 is to carry out a bevel cut.

Basically, the work sequence illustrated in FIGS. 14–20 is similar to that described in connection with FIGS. 7–13; the cut to be made, however, is an angular or inclined cut, as best seen in FIG. 14 et seq., obtaining by inclining the cutting plane 3 and the turret 2.

Figure 15:
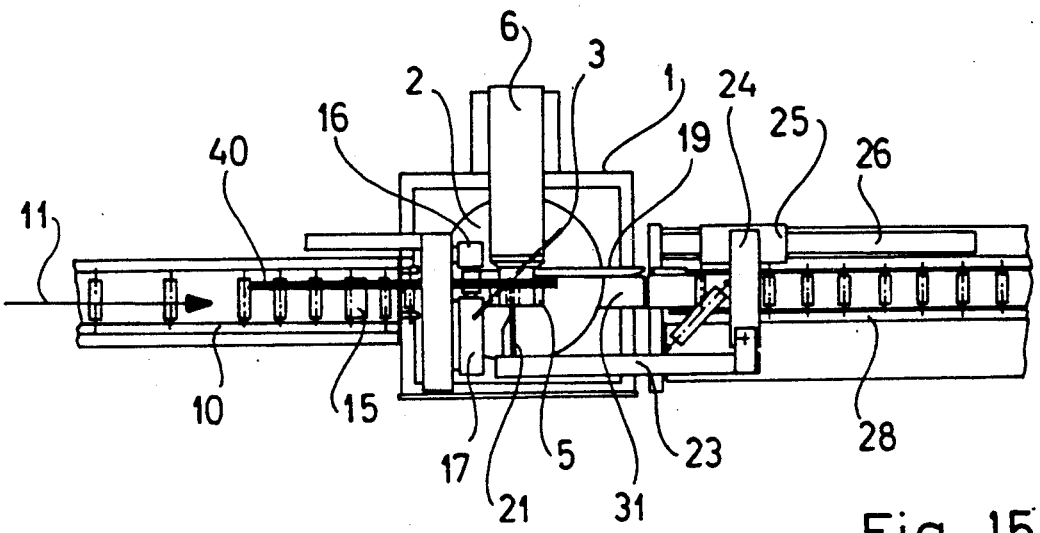
Figure 16:
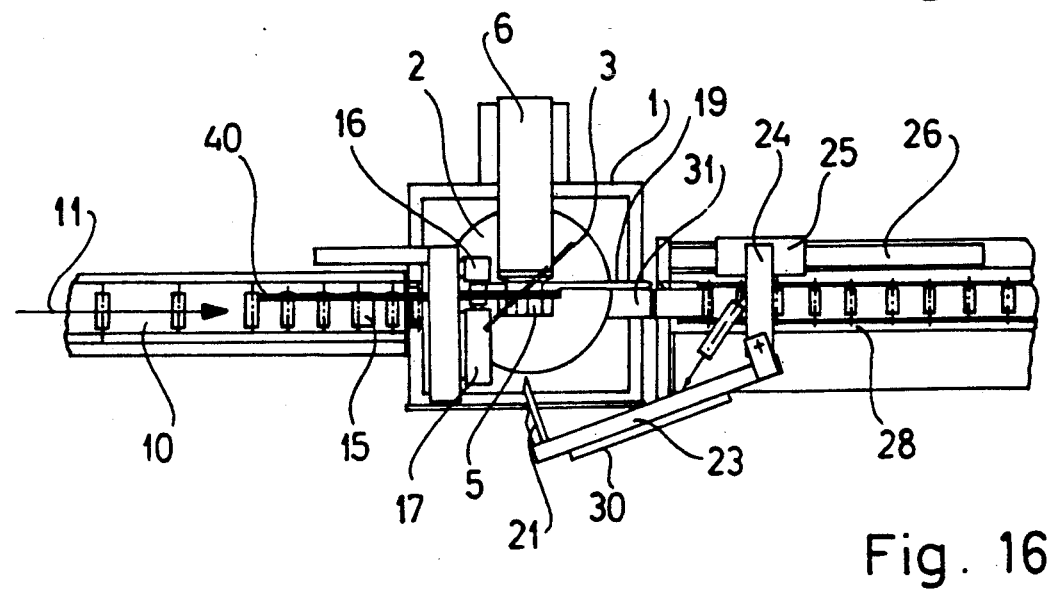

FIG. 14 illustrates stock material 40 fed into cutting position. Finger 21, as seen in FIG. 15, is then engaged against the stock material. The stock material is then clamped by the vertical clamp—not shown—and the finger withdrawn. FIG. 16 illustrates the position during cutting. The feed jaws 16, 17 are reset by the distance for the next-to-be-cut workpiece and again engage the stock material.

Figure 17:
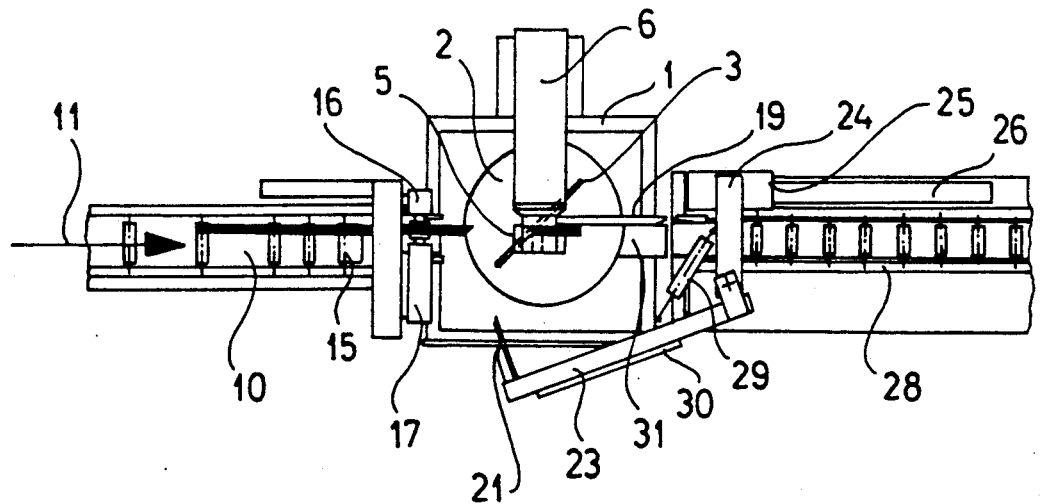
Figure 18:
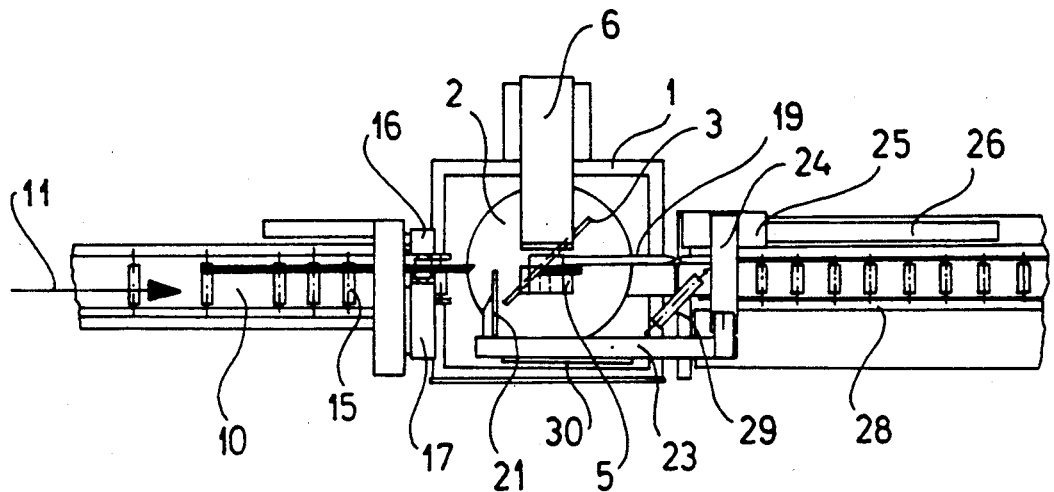
Figure 19:
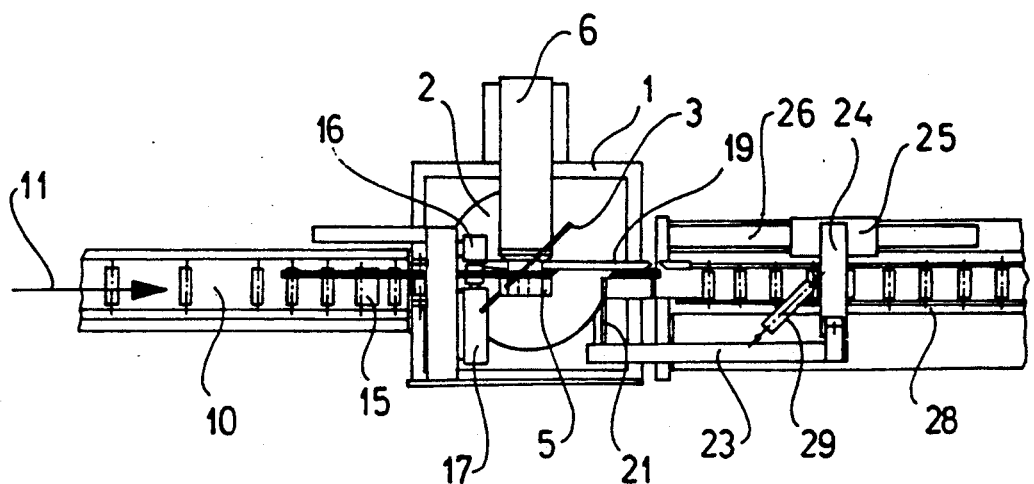

After making the cut, the feed jaws 16, 17, together with the stock material 40 and also the finger 21, carried by its arm 23 on the bridge 24 and the slider 25, are all moved counter the feed direction 11, in a counter stroke, so that the finger 21 can reach around the cut-off material. The reach of the finger 21 is up to just the position of the guide bar or plate 19. Leftward movement of the jaws 16, 17 and the finger 21 is shown in FIG. 17 and insertion of the finger 21 behind the workpiece is shown in FIG. 18. Of course, the vertical clamping jaw 5 has released the stock material 40 prior to the rearward movement of the feed jaws 16, 17.

Figure 20:
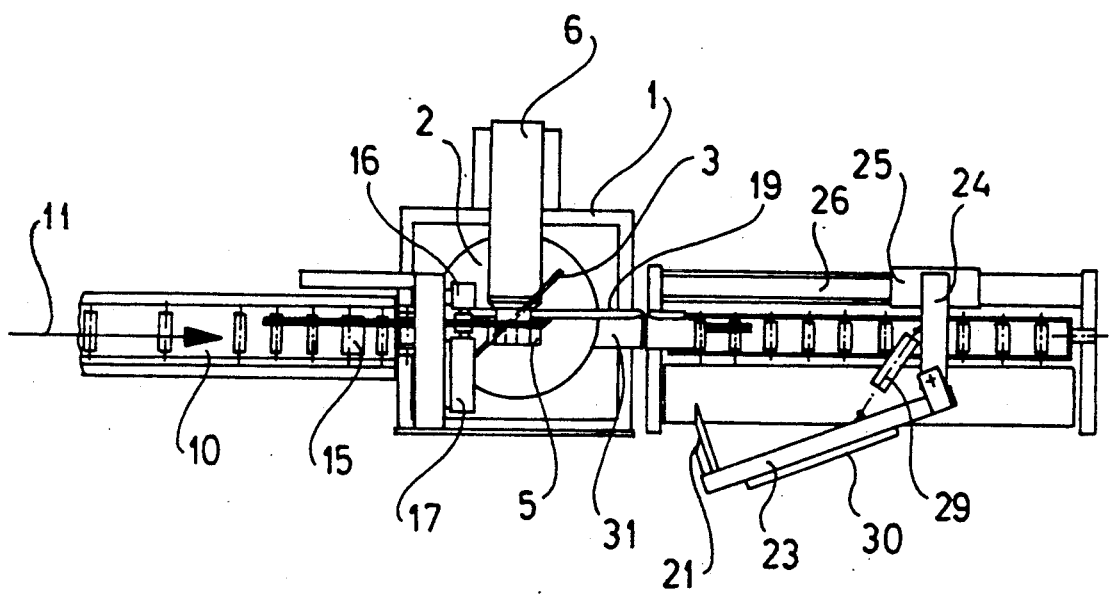

FIG. 18 illustrates the position of the finger 21 behind the workpiece, to be followed by movement in the feed direction of the feed jaws 16, 17 as well as of the finger 21 in accordance with the arrow 11, thus bringing the stock material 40 into the next-to-be-cut portion of the miter saw; the workpiece 41 is raked by the finger 21 in the direction towards the removal conveyor 28. FIG. 20 illustrates the movement of the workpiece 41 on the removal conveyor 28 and retraction of the finger 21 preparatory to movement of the slide 25 towards the left to orient the portion of the stock material engaged against the guide bar or rod 19 in proper position upon engagement of the finger 21 thereagainst as shown in FIG. 15.

Further handling of the workpiece 41 from the removal conveyor 28 is as previously described.

The system is very simple and does not require any complex structures or apparatus to supply the stock material to form workpieces, and permits simple handling in connection with cutting operation and subsequent removal of cut workpieces or cut wedges, slivers and the like. The entire operation can be easily followed, is visible, and hence maintenance of the apparatus and visual supervision by an operator is simple.

Of course, any other features, well known in the cutting and feeding technology, can be combined with the system, so that it is readily compatible with existing arrangements. For example, the feed jaws 16, 17 can have a longitudinal stroke long enough to return stock material 40 to the feed conveyor 10 for return of such stock material as has not been used up via the chain conveyor 12 to a stock holding or storage station and the like.

The invention has been described in connection with a circular saw; other saws can be used, for example a band saw, reciprocating hack saws and the like.

Various changes and modifications may be made, and many structural alternatives to those described are possible. For example, the finger 21 can be mounted in various ways. In a preferred form, the finger is located on the operating arm 23 which is longitudinally slidable and, further, pivotable on the bridge 24. This is a most simple way to move the finger 21 in feed direction, counter the feed direction as well as towards and against the stock material. It also readily permits the application of the guide sheet 30 to the operating arm 23 to guide cut-off workpieces or scrap 41. The guide sheet 30, of course, should terminate just above the work table 2 and the removal conveyor 28. It effectively prevents misalignment of the workpiece and/or scrap when it is raked or fed by the finger 21 when the finger 21, on the slider 25, moves longitudinally in the feed direction.

The removal conveyor 28 is not strictly necessary, but, in a preferred form of the invention, it is used in combination with the removal finger 21. It permits regular removal of the workpieces and/or scrap, slivers and the like and, in a particularly preferred form, permits sorting of workpieces by appropriate tipping or tilting when the workpieces have reached a predetermined position on the removal conveyor, for example by tilting or tipping in one direction for workpieces, and in another direction for scrap. The removal conveyor should be as smooth as possible, and have as few surface interruptions as possible so that small workpieces or scrap pieces, which may result when the miter angle of the saw is changed, can be raked reliably by the finger 21. Cover sheets which just permit the rollers 32 to project therefrom are particularly desirable for longer and heavier workpieces.

In many customary installations for an automatic cut-off saw, a removal conveyor is associated with the saw. This permits constructing the guide system, for example guide rails or guide rods 26 for the operating arm 23 of the finger 21 on the same frame as that used for the removal conveyor. The slider 25 preferably vertically supports a bridge element 24, spaced above the conveyor 28 by a sufficient distance to permit passage of even the largest workpiece, for which the saw is designed, therebeneath. Use of a cylinder—piston arrangement to move the operating arm, as shown at 29 in FIG. 2, is a particularly simple and easily maintained arrangement. Of course, a more complex slider system can be used, with the operating arm 23 extending essentially parallel to the feed direction and moving transversely thereto.

The length of the guide track for the slider 25 should be so selected that it permits a stroke length of the finger from a position just ahead of the cutting plane 3 over to the transport conveyor 25. The finger 23 should have three predetermined projecting positions, namely one just in advance of the vertical clamping jaw 5, to rake behind the cut workpiece after cutting; a next one, at the level of the vertical clamping jaw 5 to provide for aligning the stock 40 against the guide bar or plate 19; and a third to move the workpiece over the conveyor 28 after the finger has gripped behind the workpiece. The finger 21, thus, has a multiple function—to provide for precise alignment of the stock material against the guide plate or bar 19 and, further, for removal of the cut-off element.

Supply of stock material 40 to the saw can be in accordance with any well known structure; in accordance with a preferred feature of the invention, it includes a roller conveyor 10 with driven rollers. In accordance with a feature of the invention, a reference abutment 15 which can be placed in and out of engagement with respect to stock material is provided, so that feed jaws 16, 17 can operate on the stock material, after it is fed to the reference abutment, by reciprocating next to the feed conveyor 10.

Newly supplied stock material can be located against the reference abutment when it is in an interfering position, to be gripped by the feed jaws at that time. Upon removal of the reference abutment 15 from interfering position, in the simplest way by merely pivoting it out of the way, the feed jaws 16, 17 can then feed the workpiece material for a precise distance to the cutting plane 3.

After the workpiece is made, or after a plurality of workpieces are made, and the particular stock is not to be used anymore, the remainder can be returned by the feed jaws 16, 17 to the supply conveyor 10 and there fed backwardly, by reverse drive of the rollers thereof, for return to storage or stocking.

Various other changes and modifications may be made, and any features described herein may be used with any of the others, within the scope of the inventive concept.

I claim:

1. A method of operating a cut-off saw system for severing elongated stock material to cut workpieces or other cut elements therefrom, said system including a work table (2) formed with a slit for a cutting saw, the slit defining a cutting plane (3);

supply feed means (10) for feeding said stock material (40) in a feeding direction (11) towards the cutting plane (3);

guide means (19) defining a guide plane for guiding said stock material, before severing, and said cut-off elements, located downstream, with respect to said feeding direction (11), of the cutting plane (3);

positioning means (21, 23, 30) movable towards the guide means and engaging said stock material prior to severing thereof for positioning said stock material against the guide means (19); and hold-down means (4, 5) for holding the stock material against the work table (2), comprising the steps of feeding a predetermined length of stock material (40) past said cutting plane and parallel to said guide means (19);

locating the positioning means (21) laterally against said stock material to press said stock material against said guide means (19);

moving the hold-down means (5) against the stock material to clamp the stock material against the work table (2);

retracting the positioning means (21) and removing it from engagement with said clamped stock material;

severing the stock material to form a workpiece (41) while the stock material and the then severed workpiece are clamped against the work table by said hold down means;

retracting said hold down means (5) to release the now severed workpiece;

moving said positioning means (21) counter said feeding direction and engaging said positioning means behind the cut surface of the cut-off element;

longitudinally moving the positioning means (21) in a removal direction essentially in line with said feeding direction (11) to a removal position to thereby rake said cut-off element (41) to the removal position; and disengaging said positioning means (21) from the cut-off element and returning said positioning means to a position in the vicinity of said cutting plane and laterally with respect to said stock material.

2. The method of claim 1, wherein said positioning means comprises a finger means (21) and an operating means (23, 24, 29)
including the steps of
selectively moving said finger means into, then out of lateral engagement with said stock material (40) for first positioning the stock material against said guide means (19) and then permitting said stock material to be cut to sever the workpiece or cut-off elements from the stock material, then behind and in engagement with a cut end of said cut-off element (41) by operating said operating means to, selectively, project and retract said finger means;
and further including the step of longitudinally moving said finger means (21) for raking the cut-off element towards the removal position.

3. The method of claim 2, further including the step of guiding said cut-off element essentially in-line with said feeding direction towards said removal position upon movement of said finger means (21) towards the removal position.

4. The method of claim 2, wherein the step of selectively moving said finger means out of engagement with the stock material and then engagement and, behind said cut-off element (41) comprises pivoting an operating arm (23) to, selectively, project and retract said finger means.

5. The method of claim 4, wherein the step of engaging the finger means behind the cut-off element comprises pivoting the finger means to a position close to said guide means (19) and, with respect to said feeding direction, upstream of said cutting plane (3) to reach behind a cut-off element (41) and rake said element toward the removal position upon subsequent longitudinal movement of the positioning means.

6. The method of claim 5, including the step of retracting the stock material (40) after severing of the workpiece or cut-off elements (41) therefrom, counter said feeding direction (11) to permit entry of the finger means (21) behind the severed workpiece or cut-off elements.

7. The method of claim 6, wherein said retraction step is over a distance greater than the spacing between the position of the finger means (21) and said cutting plane (3) when the finger means move close to said guide means (19) and with respect to said feeding direction, upstream of said cutting plane (3).

8. In combination with a cut-off sawing means for severing of elongated stock material (40) to cut workpieces or other cut-off elements (41) therefrom,
a system to handle the stock material (40) and cut workpiece or cut-off elements (41), comprising
a work table (2) formed with a slit for a cutting saw, the slit defining a cutting plane (3);
supply feed means (10) for feeding said stock material (40) in a feeding direction (11) towards the cutting plane (3);
feed jaw means (16, 17) movable toward and away from the cutting plane (3) for feeding stock material towards said cutting plane and, selectively, retracting stock material after cutting to permit removal of the cut workpiece or cut-off element (41);

elongated guide means (19) affixed to the work table and defining a guide plane for guiding said stock material, before severing, and said workpiece or cut-off elements, located downstream, with respect to said feeding direction (11), of the cutting plane (3),
said guide means being formed with a passage-way in said cutting plane for the saw;
positioning means (21, 23, 30) movable towards the guide means and engaging said stock material prior to severing thereof for positioning said stock material against the guide means (19); and
hold-down means (4, 5) for holding the stock material against the work table (2),
wherein
said positioning means (21, 23, 30) comprises
a projecting finger means (21) having a clamping or gripping surface extending at essentially right angles to said feeding direction (11);
said hold-down means being formed with a recess (22) dimensioned to permit entry of the finger means (21) therein;
moving and operating means (23, 24, 25, 26, 29, 35) are provided, selectively moving said finger means (21) into and out of engagement with the stock material, in timed relationship with respect to movement of said feed jaw means (16, 17) but independently of said feed jaw means, for moving said finger means at least approximately up to said guide plane of the guide means (19) for acting laterally against the stock material and in a direction transverse to said feeding direction,
said moving and operating means further controlling movement of said finger in a removal direction away from said cutting plane (3), said moving and operating means moving said finger means (21) after cutting of the stock material (40) and formation of the workpiece or cut-off elements (41) behind said workpiece or elements to rake said workpiece or elements in a removal direction and essentially parallel to said feeding direction (11).

9. The system of claim 8, wherein said recess (22) in said hold-down means (5) is positioned in the cutting plane (3) and further extends towards the stock supply side laterally of the cutting plane;
and wherein said moving means (25, 26, 35) and said operating means (23, 24, 29) place the finger means (21) at said position laterally of the cutting plane when stock material (40) is to be positioned against said guide means (19).

10. The system of claim 8, wherein the clamping or gripping surface of said finger means (21) is slightly longer, in a direction perpendicular to said work table (2) than half the maximum diameter for which the system is designed.

11. The system of claim 8, wherein said finger means (21), in feeding direction (11) of the stock material, is of thin dimension, and said recess (22) in said hold-down means (5) is dimensioned to just receive said finger means.

12. The system of claim 8, wherein said operating means (23, 24, 29) comprise a pivotable operating arm (23) and a slider (25), said operating are (23) being pivotably connected to said slider with one end thereof and carrying said finger means (21) adjacent another end thereof, said slider being slidable parallel to said feeding direction (11) of the stock material.

13. The system of claim 12, further including a guide sheet element (30) secured to said pivotable arm (23) and extending up to just about said work table to guide cut-off elements (41) upon longitudinal movement of said slider (25).

14. The system of claim 8, further including a removal conveyor (28) for removal of cut off elements (41) raked away by said projecting finger;
and wherein said removal conveyor is formed with a surface which is essentially smooth and formed with only narrow gaps therein to prevent catching or dropping of cut-off elements.

15. The system of claim 14, wherein said removal conveyor comprises a plurality of rollers (32) located in spaced position in said feeding direction (11);
and a plurality of shielding elements (33) positioned between said rollers at a level to just permit projection of the top surfaces of the rollers thereabove to provide said essentially uninterrupted surface.

16. The system of claim 14, wherein said moving means for said finger means includes a slider (25);
guide means (26) for said slider;
a frame (27) for said removal conveyor, said guide means for the slider being secured to said frame;
and a bridge element (24) extending from said guide means (26) across the removal conveyor at a level higher than the maximum height of a workpiece for which said system is designed;
and wherein said operating means (23, 24, 29) are secured to said bridge (24).

17. The system of claim 16, wherein said operating means comprises a pivot arm (23) pivotably connected at one end to said bridge and carrying said finger means (21) at another end thereof;
and a cylinder-piston unit (29) coupled between the operating arm and said bridge (24) for pivoting said operating arm towards and away from said guide plane of the guide means (19).

18. The system of claim 16, wherein said guide means (26) has a length for guiding said slider (25) which extends from a position just in advance, with respect to said feeding direction, of the cutting plane to a position above said removal conveyor.

19. The system of claim 8, wherein said supply feed means (10) comprises a supply conveyor driveable in either direction for supply of stock material and removal of partially used stock material;
a movable reference abutment means (15) is provided, movable between an interfering position with respect to stock material (40) fed in said feeding direction (11) and noninterfering position; and wherein
the feed jaw means (16, 17) are movable from between a region ahead of said reference abutment means, with respect to said feeding direction (11), close to said cutting plane (3).

20. The system of claim 8, wherein said guide means (19) comprises a guide plate of guide bar extending, in said feeding direction, from at least said cutting plane to at least partially across said work table (2).

21. The system of claim 8, wherein said feed jaw means (16, 17, is movable in feeding direction to move stock material (40) towards said cutting plane, and, after severing of the workpiece or cut-off elements (41) at the cutting plane, to move counter said feeding direction and permit entry of the finger means (21) behind the severed workpiece or cut-off elements said movement counter the feeding direction extending over a distance which is greater than the distance between the position of the finger means (21) and said cutting plane (3) when the finger means has moved close to said guide means (19) and, with respect to said feeding direction, upstream of said cutting plane (3).

* * * * *